(12) United States Patent
Ackermann et al.

(10) Patent No.: US 12,509,879 B2
(45) Date of Patent: *Dec. 30, 2025

(54) FULLY BONDED SINGLE-LAYER WATERBAR

(71) Applicant: SIKA TECHNOLOGY AG, Baar (CH)

(72) Inventors: Herbert Ackermann, Tann (CH); Roy Z'Rotz, Ebikon (CH); Robert Roskamp, Altdorf (CH); Roman Da Rin, Emmenbrücke (CH); Christoph Fäh, Kriens (CH); Matia Bulloni, Aranno (CH); Martin Eckl, Wädenswil (CH); Marcel Langenegger, Hedingen (CH); Patrick Bräker, Schaffhausen (CH); Simon Schönbrodt, Sarnen (CH); Wolf-Rüdiger Huck, Gockhausen (CH)

(73) Assignee: SIKA TECHNOLOGY AG, Baar (CH)

( * ) Notice: Subject to any disclaimer, the term of this patent is extended or adjusted under 35 U.S.C. 154(b) by 348 days.

This patent is subject to a terminal disclaimer.

(21) Appl. No.: 17/923,976

(22) PCT Filed: Jun. 17, 2021

(86) PCT No.: PCT/EP2021/066423
§ 371 (c)(1),
(2) Date: Nov. 8, 2022

(87) PCT Pub. No.: WO2021/255175
PCT Pub. Date: Dec. 23, 2021

(65) Prior Publication Data
US 2023/0220663 A1    Jul. 13, 2023

(30) Foreign Application Priority Data

Jun. 18, 2020 (EP) .................................... 20180714

(51) Int. Cl.
*B29C 48/00* (2019.01)
*E04B 1/68* (2006.01)
(Continued)

(52) U.S. Cl.
CPC ........ *E04B 1/6807* (2013.01); *B29C 48/0012* (2019.02); *B29C 48/022* (2019.02);
(Continued)

(58) Field of Classification Search
CPC ......................... B29C 48/022; B29C 48/0012
See application file for complete search history.

(56) References Cited

U.S. PATENT DOCUMENTS

| 4,867,601 | A * | 9/1989 | Bowman | ............... E02D 29/124 |
| | | | | 404/26 |
| 6,231,970 | B1 * | 5/2001 | Andersen | .................. C08L 3/02 |
| | | | | 106/206.1 |
| 10,655,323 | B2 * | 5/2020 | Ackermann | ............ B32B 13/12 |

FOREIGN PATENT DOCUMENTS

| CN | 108530769 A | 9/2018 |
| EP | 0 737 713 A1 | 10/1996 |
| (Continued) | | |

OTHER PUBLICATIONS

Bergen International, "Extrusion Processing Guide", https://bergeninternational.com/processing-tips/extrusion-extruding-chemical-foaming-agents-plastics-processing-guide/, 11 pages. (Year: 2024).*
Dow; "ELVAX(TM) 260 Technical Data Sheet;" 2019; Retrieved from the Internet: URL:https://www.dow.com/en-us/document-viewer.html?ramdomVar=4381556981195177414&docPath=/content/dam/dcc/documents/en-us/productdatasheet/914/914- 16201-01-elvax-260-ethylene-vinyl-acetate-copolymer-tds.pdf.
(Continued)

*Primary Examiner* — Emmanuel S Luk
(74) *Attorney, Agent, or Firm* — Oliff PLC

(57) ABSTRACT

A method for producing a single-layer waterbar, use of a single-layer extruded profile as a waterbar, a method for sealing an internal or an external joint between two sections of concrete, and sealed construction; wherein the production method includes extruding a melt-processed starting com-
(Continued)

position through an extruder die to form an extruded profile, wherein the starting composition includes 35-75 wt.-% of at least one polymer and 25-65 wt.-% of at least one solid particulate filler.

13 Claims, 1 Drawing Sheet

(51) Int. Cl.
  *B29K 23/00* (2006.01)
  *B29K 105/04* (2006.01)

(52) U.S. Cl.
  CPC .... *B29K 2023/06* (2013.01); *B29K 2023/083* (2013.01); *B29K 2105/04* (2013.01)

(56) References Cited

FOREIGN PATENT DOCUMENTS

| WO | 2016/050603 A1 | 4/2016 |
| WO | 2017/108844 A1 | 6/2017 |
| WO | 2019/001805 A1 | 1/2019 |

OTHER PUBLICATIONS

Sika; "Sika Waterbars Flexible PVC Waterstop Product Data Sheet Version No. 0917 (replaces 0615);" 2017; Retrieved from the Internet: URL: https://nzl.sika.com/dms/getdocument.get/813437fa-cd11-3026-8633-ad0430abe6c1/Sika%20NZ%20Waterbars%20-%20PDS.pdf.

Aug. 25, 2021 Search Report issued in International Patent Application No. PCT/EP2021/066423.

Aug. 25, 2021 Written Opinion of the International Searching Authority issued in International Patent Application No. PCT/EP2021/066423.

* cited by examiner

FULLY BONDED SINGLE-LAYER WATERBAR

TECHNICAL FIELD

The invention relates to sealing elements and use thereof for sealing of concrete joints against penetration of water. In particular, the present invention relates to internal and external sealing elements, which are suitable for sealing of joints formed between casted sections of concrete. Such sealing elements are commonly known as waterbars and waterstops.

BACKGROUND ART

Polymeric sheets, which are often referred to as waterproofing membranes, are commonly used in the construction industry for sealing bases, underground surfaces or buildings against water penetration. Waterproofing membranes are applied, for example, to prevent ingress of water through cracks that develop in the concrete structure due to building settlement, load deflection or concrete shrinkage. Furthermore, large concrete structures, such as slabs, dams, tanks, and foundations, cannot be casted as one monolithic unit and, therefore, they contain a number of joints formed between the concrete bodies. These concrete joints also must be sealed to prevent passage of water into and through the joint.

Waterproof profiles, also known as waterbars or waterstops, are commonly used for sealing of concrete joints. They are provided in a range of different compositions, shapes and sizes to suit different types of concrete structures and sealing applications. Joints are provided between adjacent concrete bodies to accommodate expected physical changes of concrete when subjected to environmental and mechanical conditions or to assist in the construction and placement of concrete. Physical changes may result from drying, shrinkage, carbonation, or creep of the concrete mass or from a load applied on the concrete body. The joint can also be formed, for example, due to a scheduled or unscheduled interruption in concrete placement.

Expansion joints are formed in concrete structures at regular intervals to accommodate the movement caused by expansion of concrete mass. Expansion joints are also commonly designed to isolate structural elements from each other, such as walls or columns from floors and roofs, pavement from bride decks, or where wall elements change directions. Contraction joints are used to regulate the cracking that occurs due to unavoidable and unpredictable contraction during hardening of concrete. Contraction joints may be made during casting of the concrete by forming the joint with a plate or after construction by cutting the joint. Construction joints are created at certain locations during massive concrete placements due to scheduled or unscheduled interruptions. In this case the concrete bodies are not expected to have dimensional changes and, therefore, construction joints are not provided with a predetermined expansion gap.

Waterbars are typically provided as strip-like profiles having a center portion and two side portions or side flanges located on opposite sides of the center portion. Depending on the application, the center position of a waterbar can be positioned along a concrete joint ("external waterbar") or inside the concrete joint to be formed ("internal waterbar"). Waterbars are provided in various shapes and sizes to adapt to the requirements of the sealing application. Flat and dumbbell-shaped waterstops are typically used for sealing of construction and contraction joints whereas waterstops with an expansion element, such as a "centerbulb", are used for sealing of expansion joints. The centerbulb is typically provided as a hollow profile, which allows wider range of movement in transverse, lateral, or shear directions without excessively stretching the material.

Waterbars are typically used in pre-applied waterproofing applications, where the sealing element is installed in place prior to the concrete joint to be waterproofed is formed. A waterbar can installed as an external sealing element, in which case the side flanges of the waterbar are embedded in the rear face of a concrete structure or as an internal sealing element, in which case the side flanges become completely embedded in the casted concrete structure. The method for sealing a concrete joint using an external waterbar typically comprises steps of placing the waterbar on a base and casting the sections of concrete such that the side flanges become embedded in rear faces of the casted concrete bodies and the center portion of the waterbar is located along the formed concrete joint. External waterstops are equally suitable for sealing of expansion, construction, and contraction joints.

The method for sealing a concrete joint using an internal waterbar typically comprises steps of placing the waterbar inside the joint to be formed after casting of concrete such that the center portion is positioned in the middle of the planned concrete joint. The Installation of the waterstop can be conducted, for example, by using a split formwork, which allows the insertion of the waterstop through the formwork. Typically, at least one of the side flanges is fixed to reinforcing steel bars in order to prevent undesired movement of the waterstop during casting of the concrete sections. After the first section of concrete has been casted, the formwork is removed followed by casting of the second section of concrete. In case an expansion joint, an expansion or a filler board is typically positioned in the joint opening after the formwork has been removed and before casting of the second section of concrete. Such expansion boards are composed of compressible materials, such as foam- and fiber-based materials and they are designed to absorb the expansion and contraction movements of the adjacent concrete bodies.

Most commonly used materials for providing waterstops include metals and polymers, such as rubbers, for example styrene-butadiene rubber, butyl rubber, nitrile rubber, and ethylene propylene diene monomer (EPDM) rubber, and thermoplastics, in particular polyolefins and polyvinylchloride (PVC). The polymers do not bond well to concrete and, therefore, the side flanges of a waterbars are typically provided with multiple raised ribs, fins, or other protrusions, which provide mechanical interlocking to the concrete structures and a seal against flow of water when embedded in the concrete structure. Strip-like thermoplastic profiles can be easily produced by extrusion techniques but the complexity of the shapes of the laterally extending flanges complicates the production process and increases the production costs. Furthermore, waterbars are typically composed of relatively stiff materials to enable effective anchoring of the side flanges to casted concrete structures via fins, ribs and other protrusions. Due to the stiffness of the material and the presence of the protrusions, waterbars cannot be stored in form of rolls like waterproofing membranes, which increases the amount of space required for transportation and storage of the waterbars.

There is thus a need for a novel type of waterbar, which can be produced with reduced costs and which can be stored and transported in form of rolls.

SUMMARY OF THE INVENTION

The objective of the present invention is to provide a sealing element suitable for sealing of concrete joints, which sealing element can be produced with decreased costs compared to the State-of-the-Art waterbars.

Another object of the present invention is to provide a sealing element, which can easily be stored in form of rolls.

It was surprisingly found that a single-layer waterbar obtained by extruding a highly filled polymeric composition can solve or at least mitigate the problems related to State-of-the-Art polymeric waterbars.

Particularly, it was found out that the top and bottom surfaces of an extruded single-layer profile are operative to bond to cementitious compositions casted against it without the presence of raised ribs, fins, or other protrusions.

The subject of the present invention is a method for producing a single-layer waterbar as defined in claim 1.

One of the advantages of the single-layer waterbar produced by using the method of the present invention is that since the side portions of the waterbar can be anchored to the concrete structures without the use of ribs or other keying formations or surface coatings, the single-layer waterbar can be produced with a simplified shape, which significantly decreases the production costs.

Another advantage of the single-layer waterbar produced by using the method of the present invention is that the waterbar can be provided with reduced dimensions, particularly with reduced width, since the top and bottom surfaces of the waterbar are operative to bond cementitious compositions casted against them.

A still another advantage of the present invention is that the single-layer waterbar produced by using the method of the present invention can be prepared using flexible polymer blends, which enables storing of the waterbars in form of rolls.

Other subjects of the present invention are presented in other independent claims. Preferred aspects of the invention are presented in the dependent claims.

DETAILED DESCRIPTION OF THE INVENTION

Figure 1:
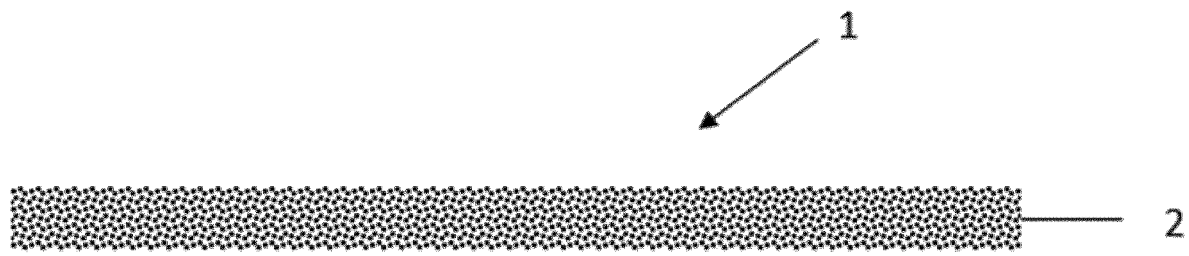
FIG. 1 shows a cross-section of a single-layer waterbar (1) composed of an extruded profile (2).

The subject of the present invention is a method for producing a single-layer waterbar, the method comprising extruding a melt-processed starting composition through an extruder die to provide an extruded profile, wherein the starting composition comprises:
a) 35-75 wt.-%, preferably 40-70 wt.-% of at least one polymer P and
b) 25-65 wt. %, preferably 30-60 wt.-% of a least one solid particulate filler F, all proportions being based on the total weight of the starting composition.

Substance names beginning with "poly" designate in the present document substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

Term "polyolefin" refers in the present disclosure to homopolymers and copolymers produced solely from olefin monomers. Accordingly, copolymers of olefin monomers and non-olefinic monomers, such as copolymers of ethylene and vinyl acetate, are not "polyolefins" according to the definition of the present invention.

The term "α-olefin" designates an alkene having the molecular formula $C_xH_{2x}$ (x corresponds to the number of carbon atoms), which features a carbon-carbon double bond at the first carbon atom (α-carbon). Examples of α-olefins include ethylene, propylene, 1-butene, 2-methyl-1-propene (isobutylene), 1-pentene, 1-hexene, 1-heptene and 1-octene. For example, neither 1,3-butadiene, nor 2-butene, nor styrene are referred as "α-olefins" according to the present document.

The term "rubber" refers in the present disclosure to a polymer or a polymer blend, which is capable of recovering from large deformations, and which can be, or already is, modified to a state in which it is essentially insoluble (but can swell) in a boiling solvent, in particular xylene. Typical rubbers are capable of being elongated or deformed to at least 200% of their original dimension under an externally applied force, and will substantially resume the original dimensions, sustaining only small permanent set (typically no more than about 20%), after the external force is released. As used herein, the term "rubber" may be used interchangeably with the term "elastomer."

The term "molecular weight" designates the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane or 1,2,4-trichlorobenzene as a solvent, at a suitable temperature.

The term "softening point" refers to a temperature at which compound softens in a rubber-like state, or a temperature at which the crystalline portion within the compound melts. The softening point can be determined by ring and ball measurement conducted according to DIN EN 1238:2011 standard.

The term "melting temperature" designates a temperature at which a material undergoes transition from the solid to the liquid state. The melting temperature ($T_m$) is preferably determined by differential scanning calorimetry (DSC) according to ISO 11357-3:2018 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) designates the temperature above which temperature a polymer component becomes soft and pliable, and below which it becomes hard and glassy. The glass transition temperature is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one polymer P" refers to the sum of the individual amounts of all polymers P contained in the composition. Furthermore, in case the composition comprises 20 wt.-% of at least one polymer P, the sum of the amounts of all polymers P contained in the composition equals 20 wt.-%.

The term "normal room temperature" refers to the temperature of 23° C.

The method for producing a single-layer waterbar comprises extruding a melt-processed starting composition through an extruder die to provide an extruded profile. The term "single-layer" is understood to mean that the waterbar is composed of one single layer of material. However, the composition of the single layer may not be homogeneous throughout the volume of the layer. It is, for example, possible that the density of the layer may change in the direction of the thickness of the layer.

The term "melt-processing" refers in the present disclosure to a process, in which at least one molten polymeric component is intimately mixed with at least one other component, which may be another molten polymeric component or a solid component, such as a filler or a catalyst, until a melt blend, i.e. a substantially homogeneously mixed mixture of the polymeric component(s) and the other constituents is obtained.

The melt processing of the starting composition can be conducted as a batch process using any conventional mixer, such as a Brabender, Banbury, or roll mixer or as continuous process using a continuous type mixer, preferably an extruder, such as a single screw or a twin-screw extruder or a planetary roller extruder. The constituents of the starting composition are preferably fed into the mixer using a conventional feeding system comprising a feed hopper and feed extruder. Alternatively, some or all the constituents of the starting composition may be directly fed into the mixer as individual streams, as a pre-mix, or as a master batch. Furthermore, the constituents of the starting composition can first be processed in a compounding extruder to pellets or granules, which are then fed into the mixer.

Preferably, the method for producing a single-layer waterbar is a single layer extrusion process. In a single layer extrusion process, a single layer of material is extruded using an extruder apparatus comprising one single extruder, whereas in a co-extrusion process, two or more extruders are used to simultaneously extrude multiple layers of different materials.

According to one or more embodiments, the melt-processed starting composition is extruded using an extrusion apparatus comprising one single extruder, i.e. the melt-processed starting composition is extruded through the extruder die to provide an extruded profile using an extrusion apparatus comprising one single extruder.

The single-layer waterbar comprises a center portion and first and second side portions extending outwardly from the center portion. The single-layer waterbar is preferably in form of a continuous strip of material having first and second major surfaces, i.e. top and bottom surfaces, limited by peripheral edges and defining a thickness of the single-layer waterbar therebetween.

The top and bottom surfaces of the single-layer waterbar are operative to bond with a cementitious composition casted against it. The term "operative to bond with a cementitious composition" is understood to mean that that a surface forms a permanent bond to a cementitious composition casted against it after hardening.

The term "cementitious composition" designates concrete, shotcrete, grout, mortar, paste or a combination thereof. The terms "paste", "mortar", "concrete", "shotcrete", and "grout" are well-known terms in the state-of-the-art. Pastes are mixtures comprising a hydratable cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. Grout is a particularly flowable form of concrete used to fill gaps. The cementitious compositions can be formed by mixing required amounts of certain components, for example, a hydratable cement, water, and fine and/or coarse aggregate, to produce the particular cementitious composition. The term "fresh cementitious composition" or "liquid cementitious composition" designate cementitious compositions before hardening, particularly before setting.

Figure 2:
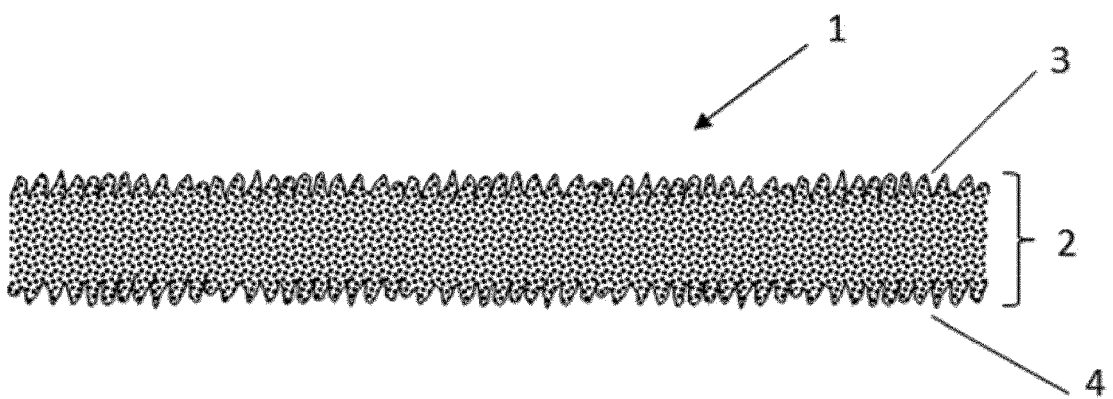
FIG. 2. shows a cross-section of a single-layer waterbar composed of an extruded profile (2) containing a surface structure (3, 4).

According to one or more embodiments, the single-layer waterbar (1) is composed of the extruded profile (2) as shown in FIGS. 1 and 2. The expression "composed of an extruded profile" is understood to mean that the waterbar contains no other layers of material than the extruded profile, for example, discontinuous or continuous coatings or layers of adhesive.

The top and bottom surfaces of the single-layer waterbar (1) may be substantially planar/smooth as shown in FIG. 1 or they can contain a surface structure (3, 4), which can be characterized as surface roughness, as shown in FIG. 2. The term "surface roughness" refers to unevenness of a surface, which can be quantified with two-dimensional (2D) surface roughness parameters as defined in ISO 4287 standard and/or with three-dimensional (3D) surface roughness parameters defined as defined in ISO 25178 standard.

Furthermore, the thickness of the single-layer waterbar may remain constant or variate along the width and/or length of the waterbar. In other words, the top and bottom surfaces can contain protrusions such as ridges, which typically run in the longitudinal (machine) direction of the extruded profile. However, it is also possible that the thickness of the single-layer waterbar remains substantially constant along the width and/or length of the waterbar and/or that the top and bottom surfaces of the waterbar are substantially free of protrusions, such as ridges or grooves.

According to one or more embodiments, the single-layer waterbar comprises a surface structure to increase the bonding to cementitious compositions casted against a surface of the single-layer waterbar. The increase of concrete adhesion strength may result from the ability of the fresh cementitious composition, such as fresh concrete, to enter the pores and other irregularities present on the surface of the single-layer waterbar and to establish additional mechanical connection between the single-layer waterbar and the cementitious composition after hardening.

According to one or more embodiments, the method for producing a single-layer waterbar comprising a further step of subjecting at least one of the top and bottom surfaces of the extruded profile to a mechanical surface treatment step selected from the group consisting of grinding, brushing, and abrasive blasting.

The term "mechanical surface treatment" refers in the present document any surface treatment involving a change in texture of the surface, which may involve removal of some amount of material.

Brushing can be conducted using any conventional brushes such as plate brushes, tool brushes, tube brushes, spiral brushes, circular brushes, belt brushes, roller brushes, and wire brushes. Suitable brushes to be used for mechanical surface treatment are equipped with bristles having sufficient stiffness to enable the modification of the surface texture. It may be preferred that the bristles have a flexural modulus measured according to ISO 178:2001 of at least 2500 MPa, preferably at least 3000 MPa. Particularly suitable materials for the bristles include metallic materials such as brass, phosphor bronze, carbon steel, and stainless steel, and plastics, preferably thermoset plastics.

Grinding can be conducted using any conventional grinding tool such as grinding wheel, cutter thread, sanding wheel, sand paper, buffer, file, preferably a grinding wheel or cutter thread, in particular a cutter thread.

The term "abrasive blasting" refers in the present disclosure to propelling a stream of abrasive blasting material, typically solid particles, against a surface to be treated under high pressure to modify the surface texture. A pressurized fluid or a centrifugal wheel is used to propel the blasting material. The abrasive blasting can be conducted as dry blasting, typically using compressed air as the blasting medium, or as wet blasting. Wet blasting is accomplished by injecting the blasting material into a pressurized water stream or creating a slurry of blasting material and water that is pressurized or introduced into a compressed air stream.

Suitable blasting materials include metal particles, synthetic mineral particles such as glass and ceramics, natural mineral particles such as corundum and sand, synthetic organic particles, such as comminuted plastic, natural organic particles, such as walnut shells and corncobs, and particles of ice and dry-ice.

According to one or more embodiments, the method for producing a single-layer waterbar is a foam extrusion process, preferably a single-layer foam extrusion process. In these embodiments, the melt-processed starting composition comprises a blowing gas, which is released from the melt-processed starting composition through surface(s) of the extruded profile discharged from the extruder die. In case of a foam extrusion process, a sheet of molten polymer composition discharged from the extruder die is first inflated due to volume increase of the blowing gas, which results in formation of a closed cell structure. Eventually, surface(s) of the extruded profile is/are penetrated by the blowing gas, which results in formation of open or semi-open cells, pores, cavities, and other surface imperfections which are accessible from the side of the top and bottom surfaces of the extruded profile. In order to prevent a premature release of the blowing gas from the melt-processed starting composition, i.e. before the starting composition is discharged through the extruder die, the extruder is preferably operated with closed venting unit(s).

The blowing gas released from the melt-processed starting composition through the surface(s) of the extruded profile is preferably present in the starting composition or in the melt-processed starting composition in form of a physical or chemical blowing agent. In case of a chemical blowing agent, the blowing agent is preferably added to the starting composition and the blowing gas is generated during the melt-processing of the starting composition. In case of a physical blowing agent, the blowing agent is preferably added to the starting composition or to the melt-processed starting composition before the melt-processed composition is extruded through the extruder die.

Suitable physical blowing agents to be used in the method for producing a single-layer waterbar include gaseous and liquid physical blowing agents.

Gaseous physical blowing agents, such as compressed nitrogen or carbon dioxide, are can be directly injected under high pressure into the melt-processed starting composition, which is conveyed through a melt-processing apparatus, such as an extruder barrel. Liquid physical blowing agents include volatile liquids which produce gas through vaporization. Suitable liquid physical blowing agents generally include water, short-chain aliphatic hydrocarbons, for example having from five to seven carbon atoms, and their halogenated, particularly chlorinated and fluorinated, derivatives. Particularly suitable liquid physical blowing agents have a standard boiling point measured at a pressure of 1 bar of not more than 250° C., preferably not more than 200° C. The standard boiling point of a liquid physical blowing agent can be measured using an ebulliometer.

Chemical blowing agents, also known as chemical foaming agents, are typically solids that liberate gas(es) by means of a chemical reaction, such as decomposition, when exposed to elevated temperatures. Chemical blowing agents may be either inorganic or organic.

According to one or more embodiments, the starting composition further comprises:

c) At least one chemical blowing agent CBA.

According to one or more embodiments, the at least one chemical blowing agent CBA has a maximum decomposition peak temperature measured by Differential Scanning calorimetry (DSC) in the range of 85-225° C., preferably 95-215° C., more preferably 105-205° C., even more preferably 115-195° C. The maximum decomposition peak measured by DSC is preferably determined by using a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

Suitable substances to be used as the at least one chemical blowing agent CBA include, for example, azodicarbonamide, azobisisobutyronitrile, azocyclohexyl nitrile, dinitrosopentamethylene tetramine, azodiamino benzene, calcium azide, 4,4'-diphenyldisulphonyl azide, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl hydrazide, p-toluenesulphonyl semicarbazide, trihydrazino triazine, N,N'-dimethyl-N,N'-dinitrosoterephthalamide, diazoaminobenzene, diazoaminotoluene, hydrazodicarbonamide, barium azodicarboxylate, 5-hydroxytetrazole, sodium bicarbonate, ammonium carbonate, ammonium bicarbonate, potassium bicarbonate, and organic acids.

Most of the above listed preferable chemical blowing agents, such as sodium bicarbonate, are solid at normal room temperature and are typically provided in powder form. The particle size of such powders is preferably not too low in order to prevent premature decomposition the chemical blowing agent during a pre-mixing process, for example, during pre-mixing of the constituents of the starting composition. A narrow particle size distribution may also be preferred in order to better control the decomposition temperature of the chemical blowing agent.

According to one or more embodiments, the at least one chemical blowing agent CBA is present in the starting composition in form of solid particles having a median particle size $d_{50}$ in the range of 0.5-100 μm, preferably 1.0-75 μm, more preferably 2.5-50 μm, even more preferably 5-35 μm.

The term "particle size" refers in the present disclosure to the area-equivalent spherical diameter of a particle ($X_{area}$). The term "median particle size $d_{50}$" refers to a particle size below which 50% of all particles by volume are smaller than the $d_{50}$ value. The particle size distribution can be measured by laser diffraction according to the method as described in standard ISO 13320:2009. The particle size distribution can be measured using a wet or dry dispersion method and a Mastersizer 2000 device (trademark of Malvern Instruments Ltd, GB).

Suitable organic acids for use as the at least one chemical blowing agent CBA include, for example, monocarboxylic acids, such as acetic acid and propionic acid, solid polycarboxylic acids, such as solid, hydroxy-functionalized or unsaturated dicarboxylic, tricarboxylic, tetracarboxylic or polycarboxylic acids, in particular citric acid, tartaric acid, malic acid, fumaric acid, and maleic acid.

Although some of the compounds used in the present invention are characterized as useful for specific functions, the use of these compounds is not limited to their stated functions. For example, it is also possible that some of the substances presented above as chemical blowing agents can also be used as activators for the at least one chemical blowing agent CBA.

For example, commonly used activators for organic acid-based chemical blowing agents include hydrogen carbonate (bicarbonate) and carbonate salts, especially those of formula $XHCO_3$ or $X_2CO_3$, wherein X stands for a generic cation, such as $Na^+$, $K^+$, $NH_4^+$, ½ $Zn^{2+}$, ½ $Mg^{2+}$, and ½$Ca^{2+}$, in particular $Na^+$ and K. On the other hand, these types of activators may themselves be suitable for use as the at least one chemical blowing agent CBA.

According to one or more embodiments, the starting composition comprises, in addition to the at least one chemical blowing agent CBA, at least one activator for the at least one chemical blowing agent CBA.

According to one or more embodiments, the at least one chemical blowing agent CBA is selected from the group consisting of bicarbonates of formula $XHCO_3$ and carbonates of formula $X_2CO_3$, wherein X stands for a generic cation, in particular $Na^+$, $K^+$, $NH_4^+$, ½ $Zn^{2+}$, ½ $Mg^{2+}$, or ½ $Ca^{2+}$, preferably from the group consisting of bicarbonates of formula $XHCO_3$, wherein X stands for a generic cation, in particular $Na^+$, $K^+$, $NH_4^+$, ½ $Zn^{2+}$, ½ $Mg^{2+}$, or ½ $Ca^{2+}$, more preferably from the group consisting of sodium and potassium bicarbonates.

The at least one chemical blowing agent CBA preferably comprises not more than 2.5 wt.-%, more preferably not more than 1.5 wt.-%, even more preferably not more than 1.0 wt.-%, still more preferably not more than 0.75 wt.-%, most preferably not more than 0.5 wt.-%, of the total weight of the starting composition.

According to one or more embodiments, the at least one chemical blowing agent CBA comprises at least 0.05 wt.-%, preferably at least 0.1 wt.-%, more preferably at least 0.15 wt.-%, of the total weight of the starting composition. According to one or more further embodiments, the at least one chemical blowing agent CBA comprises 0.01-1.5 wt.-%, preferably 0.05-1.0 wt.-%, more preferably 0.1-0.75 wt.-%, even more preferably 0.15-0.5 wt.-%, still more preferably 0.15-0.35 wt.-%, of the total weight of the first starting composition.

It has been found out that increasing the amount of the chemical blowing agent in the starting composition increases the surface roughness of the extruded profile, but it also has a negative impact on the mechanical properties, particularly on the tensile and tear strength of the extruded profile. Single-layer waterbars obtained from starting compositions containing the at least one chemical blowing agent in the above cited ranges have been found out to develop good bond to fresh concrete casted over their surfaces and also to have sufficient mechanical properties required in waterbar applications.

According to one or more embodiment, the method for producing a single-layer waterbar comprises a further step of cutting the extruded profile into a length.

Generally, the preferred dimensions, such as thickness, width, and length, of the single-layer waterbar depend on the intended application, mainly on the anticipated hydrostatic head of water against which the waterbar is installed and on the dimension of the concrete joint to be sealed.

It may, for example, be preferred that the single-layer waterbar has a width in the range of 50-1500 mm, more preferably 100-1000 mm. The width of the single-layer waterbar is understood to mean the dimension of the waterbar, which is measured in direction of the width of the joint opening to be sealed.

The thickness of the single-layer waterbar can be constant or variate in the longitudinal and/or transverse direction of the waterbar.

According to one or more embodiments, the single-layer watebar has a maximum thickness, determined by using the measurement method as defined in DIN EN 1849-2 standard, of 1-25 mm, preferably 2.5-20 mm, more preferably 3.5-15 mm, even more preferably 5-15 mm and/or a minimum thickness, determined by using the measurement method as defined in DIN EN 1849-2 standard, of 0.5-25 mm, preferably 1-20 mm, more preferably 1.5-15 mm, even more preferably 2.5-15 mm.

According to one or more embodiments, the mass per unit area of the single-layer waterbar is in the range of 1000-50000 g/m², preferably 1500-35000 g/m², more preferably 2500-25000 g/m², even more preferably 3500-20000 g/m². The mass per unit area of a single-layer waterbar can be determined by measuring the mass of test piece of the waterbar having a given area and dividing the measured mass by the area of the test piece.

The starting composition used in the method for producing a single-layer waterbar comprises:
a) 35-75 wt.-%, preferably 40-70 wt.-%, more preferably 45-70 wt.-%, even more preferably 50-65 wt.-%, still more preferably 55-65 wt.-%, of at least one polymer P and
b) 25-65 wt. %, preferably 30-60 wt.-%, more preferably 30-55 wt.-%, even more preferably 35-50 wt.-%, still more preferably 35-45 wt.-%, of at least one solid particulate filler F, all proportions being based on the total weight of the starting composition.

Preferably, the at least one polymer P has:
a melting temperature ($T_m$) determined by DSC according to ISO 11357-3:2018 standard in the range of 55-250° C., preferably 60-200° C., more preferably 65-175° C., even more preferably 65-155° C., still more preferably 70-135° C. and/or
a melt flow rate determined according to ISO 1133 (190° C./2.16 kg) of not more than 100 g/10 min, preferably not more than 75 g/10 min, more preferably not more than 50 g/10 min, even more preferably not more than 25 g/10 min, still more preferably not more than 15 g/10 min and/or a glass transition temperature (Tg) determined by dynamical mechanical analysis (DMA) as the peak of the measured loss modulus (G") curve using an applied frequency of 1 Hz and a strain level of 0.1% of at or below 0° C., preferably at or below −10° C., more preferably at or below −20° C., even more preferably at or below −25° C., still more preferably at or below −30° C. and/or a flexural modulus at 23° C. determined according to ISO 178:2019 standard of not more than 750 MPa, preferably not more than 500 MPa, more preferably not more than 400 MPa, even more preferably not more than 350 MPa, still more preferably not more than 300 MPa, most preferably not more than 250 MPa.

Suitable polymers to be used as the at least one polymer P include, for example, ethylene vinyl acetate copolymers (EVA), ethylene acrylic ester copolymers, ethylene copolymers, propylene copolymers, polyethylene (PE), polypropylene (PP), polyvinylchloride (PVC), polyethylene terephthalate (PET), polystyrene (PS), polyamides (PA), chlorosulfonated polyethylene (CSPE), polyisobutylene (PIB), and rubbers, for example butyl rubber, halogenated butyl rubber, ethylene-propylene diene monomer rubber (EPDM), natural rubber, chloroprene rubber, synthetic 1,4-cis-polyisoprene, polybutadiene, ethylene-propylene rubber (EPR), styrene-butadiene rubber (SBR), isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

The term "ethylene copolymer" refers to copolymers comprising at least 50 wt.-%, more preferably at least 60 wt.-% of ethylene-derived units, based on the weight of the copolymer. The term "propylene copolymer" refers to copolymers comprising at least 50 wt.-%, more preferably at least 60 wt.-% of propylene-derived units, based on the weight of the copolymer.

According to one or more embodiments, the at least one polymer P is selected from the group consisting of ethylene vinyl acetate copolymers, polyolefins, halogenated polyolefins, polyvinylchloride, and rubbers, preferably from the group consisting of ethylene vinyl acetate copolymers, polyolefins, halogenated polyolefins, polyvinylchloride, ethylene-propylene diene monomer rubber (EPDM), and styrene-butadiene rubber (SBR), more preferably from the group consisting of ethylene vinyl acetate copolymers, polyolefins, and polyvinylchloride, even more preferably from the group consisting of ethylene vinyl acetate copolymers and polyolefins.

Suitable polyolefins for use as the at least one polymer P include, for example, polyethylenes and polypropylenes. The term "polyethylene refers in the present disclosure to an ethylene homopolymer and copolymer of ethylene with one or more α-olefins whereas the term "polypropylene" refers to a propylene homopolymer and copolymer of propylene with one or more α-olefins.

Suitable copolymers of ethylene and vinyl acetate include those having a content of a structural unit derived from vinyl acetate in the range of 4-90 wt.-%, preferably 6-80 wt.-%, more preferably 8-70 wt.-%, based on the weight of the copolymer. Suitable copolymers of ethylene and vinyl acetate are commercially available, for example, under the trade name of Escorene® (from Exxon Mobil), under the trade name of Primeva® (from Repsol Quimica S.A.), under the trade name of Evatane® (from Arkema Functional Polyolefins), under the trade name of Greenflex® from Eni versalis S.p.A., and under the trade name of Levapren® from Arlanxeo GmbH.

Suitable polyethylenes include, for example, low density polyethylene (LDPE), linear low density polyethylene (LLDPE), and high density polyethylene (HDPE), preferably having a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

Further suitable polyethylenes include ethylene α-olefin copolymers, particularly random and block copolymers of ethylene and one or more $C_3$-$C_{20}$ α-olefin monomers, especially one or more of propylene, 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of ethylene-derived units, based on the weight of the copolymer.

Suitable ethylene α-olefin random copolymers include, for example, ethylene-based plastomers, which are commercially available, for example, under the trade name of Affinity®, such as Affinity® EG 8100G, Affinity® EG 8200G, Affinity® SL 8110G, Affinity® KC 8852G, Affinity® VP 8770G, and Affinity® PF 1140G (all from Dow Chemical Company); under the trade name of Exact®, such as Exact® 3024, Exact® 3027, Exact® 3128, Exact® 3131, Exact® 4049, Exact® 4053, Exact® 5371, and Exact® 8203 (all from Exxon Mobil); and under the trade name of Queo® (from Borealis AG) as well as ethylene-based polyolefin elastomers (POE), which are commercially available, for example, under the trade name of Engage®, such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414 (all from Dow Chemical Company).

Suitable ethylene α-olefin block copolymers include ethylene-based olefin block copolymers (OBC), which are commercially available, for example, under the trade name of Infuse®, such as Infuse® 9100, Infuse® 9107, Infuse® 9500, Infuse® 9507, and Infuse® 9530 (all from Dow Chemical Company).

Suitable polypropylenes include, for example, isotactic polypropylene (iPP), syndiotactic polypropylene (sPP), and homopolymer polypropylene (hPP), preferably having a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

Further suitable polypropylenes include propylene α-olefin copolymers, such as random and block copolymers of propylene and ethylene and random and block copolymers of propylene and one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of propylene-derived units, based on the weight of the copolymer.

Suitable propylene α-olefin random and block copolymers are commercially available, for example, under the trade names of Intune®, and Versify (from Dow Chemical Company) and under the trade name of Vistamaxx® (from Exxon Mobil).

Further suitable polypropylenes also include heterophasic propylene copolymers. These are heterophasic polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO)". The term "heterophasic propylene copolymer" encompasses in the present disclosure both the HECO and RAHECO types of the heterophasic propylene copolymers.

Depending on the amount of the polyolefin modifier, the commercially available heterophasic propylene copolymers are typically characterized as "impact copolymers" (ICP) or as "reactor-TPOs" or as "soft-TPOs". The main difference between these types of heterophasic propylene copolymers is that the amount of the polyolefin modifier is typically lower in ICPs than in reactor-TPOs and soft-TPOs, such as not more than 40 wt.-%, particularly not more than 35 wt.-%. Consequently, typical ICPs tend to have a lower xylene cold soluble (XCS) content determined according to ISO 16152 2005 standard as well as higher flexural modulus determined according to ISO 178:2010 standard compared to reactor-TPOs and soft-TPOs.

Suitable heterophasic propylene copolymers include reactor TPOs and soft TPOs produced with LyondellBasell's Catalloy process technology, which are commercially available under the trade names of Adflex®, Adsyl®, Clyrell®, Hifax®, Hiflex®, and Soften®, such as Hifax® CA 10A, Hifax® CA 12A, and Hifax® CA 60 A, and Hifax CA 212 A. Further suitable heterophasic propylene copolymers are commercially available under the trade name of Borsoft® (from Borealis Polymers), such as Borsoft® SD233 CF.

Particularly suitable heterophasic propylene copolymers include heterophasic copolymers comprising:
A) at least one polypropylene having a melting point ($T_m$) of 100° C. or more, preferably a propylene homopolymer and/or a random copolymer of propylene having a comonomer content of less than 10 wt.-%, preferably less than 5 wt.-%, based on the weight of the copolymer and
B) at least one polyolefin having a glass transition temperature (Tg) of −20° C. or less, preferably an ethylene copolymer having a comonomer content of at least 5 wt.-%, preferably at least 10 wt.-%, based on the weight of the copolymer, preferably having a glass transition temperature (Tg) of −25° C. or less, more preferably −35° C. or less, preferably an ethylene-propylene rubber (EPR),
wherein the at least one heterophasic propylene copolymer comprises a matrix phase composed primarily of A) and a dispersed phase composed primarily of B).

According to one or more embodiments, the at least one polymer P is selected from the group consisting of ethylene vinyl acetate copolymers and polyolefins, preferably from the group consisting of ethylene vinyl acetate copolymers and polyethylenes.

According to one or more embodiments, the at least one polymer P comprises at least one ethylene vinyl acetate copolymer P1. Generally, the expression "the at least one component X comprises at least one component XN", such as "the at least one polymer P comprises at least one ethylene vinyl acetate copolymer P1" is understood to mean in the context of the present disclosure that the starting composition comprises one or more ethylene vinyl acetate copolymers P1 as representatives of the at least one polymer P.

Preferably, the at least one ethylene vinyl acetate copolymer P1 has:
a content of a structural unit derived from vinyl acetate in the range of 4-90 wt.-%, preferably 6-80 wt.-%, more preferably 8-70 wt.-%, based on the weight of the copolymer and/or
a melt flow rate a melt flow rate determined according to ISO 1133 (190° C./2.16 kg) of not more than 35 g/10 min, preferably not more than 25 g/10 min, more preferably not more than 15 g/10 min and/or
a melting temperature ($T_m$) determined by DSC according to ISO 11357-3:2018 standard of at or below 125° C., preferably at or below 110° C., more preferably at or below 100° C., even more preferably at or below 95° C.

According to one or more embodiments, the at least one ethylene vinyl acetate copolymer P1 comprises at least 5 wt.-%, preferably at least 10 wt.-%, more preferably at least 15 wt.-%, even more preferably at least 25 wt.-%, still more preferably at least 35 wt.-%, of the total weight of the at least one polymer P.

According to one or more embodiments, the at least one polymer P comprises at least one polyethylene P2, preferably selected from the group consisting of low density polyethylene (LDPE), linear low density polyethylene (LLDPE), and high density polyethylene (HDPE), more preferably from the group consisting of low density polyethylene (LDPE) and linear low density polyethylene (LLDPE).

Preferably, the at least one polyethylene P2 has:
a melt flow rate a melt flow rate determined according to ISO 1133 (190° C./2.16 kg) of not more than 25 g/10 min, preferably not more than 15 g/10 min, more preferably not more than 5 g/10 min and/or
a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

According to one or more embodiments, the at least one polymer P comprises both the at least one ethylene vinyl acetate copolymer P1 and the at least one polyethylene P2, wherein the weight ratio of the amount of the at least one ethyne vinyl acetate copolymer P1 to the amount of the at least one polyethylene P2 is preferably from 5:1 to 1:5, more preferably from 3:1 to 1:3, even more preferably from 2:1 to 1:2.

The starting composition used in the method for producing a single-layer waterbar further comprises at least one solid particulate filler F.

Preferably, the at least one solid particulate filler F has:
a $d_{98}$ particle size of not more than 500 μm, more preferably not more than 350 μm, even more preferably not more than 250 μm, still more preferably not more than 100 μm and/or a median particle size $d_{50}$ of not 150 µm, more preferably not more than 100 µm, even more preferably not more than 50 µm, still more preferably not more than 25 µm and/or $d_{10}$ particle size of not more than 25 µm, more preferably not more than 15 µm, even more preferably not more than 5 µm, still more preferably not more than 2.5 µm.

The term $d_{90}$ particle size refers in the present disclosure to a particle size below which 90% of all particles by volume are smaller than the $d_{90}$ value. In analogy, the term "$d_{10}$ particle size" refers to a particle size below which 10% of all particles by volume are smaller than the $d_{10}$ value.

According to one or more embodiments, the at least one solid particulate filler F has a median particle size $d_{50}$ in the range of 0.1-50 µm, preferably 0.15-35 µm, more preferably 0.25-25 µm, even more preferably 0.30-20 µm, still more preferably 0.35-15 µm, most preferably 0.5-10 µm.

Preferably, the at least one solid particulate filler F is selected from the group consisting of inert mineral fillers, mineral binders, and synthetic organic fillers. The term "mineral binder" refers in the present disclosure to mineral materials, which undergo a hydration reaction in the presence of water. Suitable mineral binders for use as the at least one solid particulate filler F include hydraulic binders, non-hydraulic binders, latent hydraulic binders, and pozzolanic binders.

According to one or more embodiment, the at least one solid particulate filler F comprises at least one hydraulic binder F1.

The term "hydraulic binder" refers to substances, which react with water in a hydration reaction under formation of solid mineral hydrates or hydrate phases, which are not soluble in water or have a low water-solubility. Therefore, hydraulic binders, such as Portland cement, can harden and retain their strength even when exposed to water, for example underwater or under high humidity conditions. In contrast, the term "non-hydraulic binder" refers to substances, which harden by reaction with carbon dioxide and which, therefore, do not harden in wet conditions or under water.

Examples of suitable hydraulic binders to be used as the at least one hydraulic binder include hydraulic cements and hydraulic lime. The term "hydraulic cement" refers here to mixtures of silicates and oxides including alite, belite, tricalcium aluminate, and brownmillerite.

Commercially available hydraulic cements can be divided in five main cement types according to DIN EN 197-1, namely, Portland cement (CEM I), Portland composite cements (CEM II), blast-furnace cement (CEM III), pozzolan cement (CEM IV) and composite cement (CEM V). These five main types of hydraulic cement are further subdivided into an additional 27 cement types, which are known to the person skilled in the art and listed in DIN EN 197-1. Naturally, all other hydraulic cements that are produced according to another standard, for example, according to ASTM standard or Indian standard are also suitable for use as the at least one hydraulic binder F1.

According to one or more embodiments, the at least one solid particulate filler F comprises at least one non-hydraulic binder F2.

Examples of suitable non-hydraulic binders to be used as the at least one non-hydraulic binder F2 include air-slaked lime (non-hydraulic lime) and gypsum. The term "gypsum" refers in the present disclosure to any known form of gypsum, in particular calcium sulfate dehydrate, calcium sulfate α-hemihydrate, calcium sulfate ß-hemihydrate, or calcium sulfate anhydrite or mixtures thereof.

According to one or more embodiments, the at least one solid particulate filler F comprises at least one latent hydraulic binder F3.

The term "latent hydraulic binder" refers in the present disclosure to type II concrete additives with a "latent hydraulic character" as defined in DIN EN 206-1:2000 standard. These types of mineral binders are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases.

Examples of suitable latent hydraulic binders to be used as the at least one latent hydraulic binder F3 include ground granulated blast furnace slag. Ground granulated blast furnace slag is typically obtained from quenching of molten iron slag from a blast furnace in water or steam to form a glassy granular product and followed by drying and grinding the glassy into a fine powder.

According to one or more embodiments, the at least one solid particulate filler F comprises at least one pozzolanic binder F4.

The term "pozzolanic binder" refers in the present disclosure to type II concrete additives with a "pozzolanic character" as defined in DIN EN 206-1:2000 standard. These types of mineral binders are siliceous or aluminosilicate compounds that react with water and calcium hydroxide to form calcium silicate hydrate or calcium aluminosilicate hydrate phases.

Examples of suitable pozzolanic binders to be used as the at least one pozzolanic binder F4 include natural pozzolans, such as trass, and artificial pozzolans, such as fly ash and silica fume. The term "fly ash" refers in the present disclosure to the finely divided ash residue produced by the combustion of pulverized coal, which is carried off with the gasses exhausted from the furnace in which the coal is burned. The term "silica fume" refers in the present disclosure to fine particulate silicon in an amorphous form. Silica fume is typically obtained as a by-product of the processing of silica ores such as the smelting of quartz in a silica smelter which results in the formation of silicon monoxide gas and which on exposure to air oxidizes further to produce small particles of amorphous silica.

According to one or more embodiment, the at least one solid particulate filler F comprises at least one inert mineral filler F5.

The term "inert mineral filler" refers to mineral fillers, which, unlike hydraulic binders do not undergo a hydration reaction in the presence of water. Suitable mineral fillers to be used as the at least one inert mineral filler F5 include, for example, sand, granite, calcium carbonate, magnesium carbonate, clay, expanded clay, diatomaceous earth, pumice, mica, kaolin, talc, dolomite, xonotlite, perlite, vermiculite, Wollastonite, barite, cristobalite, silica, fumed silica, fused silica, glass beads, hollow glass spheres, ceramic spheres, bauxite, comminuted concrete, and zeolites.

The term "sand" refers in the present document mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" when used as inert mineral filler refers to solid particulate substances produced from chalk, limestone or marble by grinding and/or precipitation.

According to one or more embodiments, the at least one inert mineral filler is selected from the group consisting of sand, granite, calcium carbonate, magnesium carbonate, clay, expanded clay, diatomaceous earth, pumice, mica, kaolin, talc, potash, dolomite, xonotlite, perlite, vermiculite, Wollastonite, barite, cristobalite, silica (quartz), fumed silica, fused silica, bauxite, comminuted concrete, and zeolites, preferably from the group consisting of calcium carbonate, magnesium carbonate, diatomaceous earth, pumice, mica, talc, dolomite, xonotlite, perlite, vermiculite, Wollastonite, barite, and comminuted concrete.

According to one or more embodiment, the at least one solid particulate filler F comprises at least one synthetic organic filler F6.

Suitable synthetic organic materials to be used as the at least one synthetic organic filler F6 include in particular plastic materials having a melting temperature ($T_m$) determined by DSC according to ISO 11357 standard of at or above 250° C., preferably at or above 275° C., such as polyamide, aramid, epoxide, polystyrene, expanded polystyrene, polyethylene terephthalate (PET), poly(phenyl ethers), polysulfones, and polyethersulfones.

According to one or more embodiments, the at least one solid particulate filler F comprises or consists of the at least one hydraulic binder F1, preferably selected from the group consisting of Portland cement (CEM I), Portland composite cements (CEM II), blast-furnace cement (CEM III), pozzolan cement (CEM IV) and composite cement (CEM V).

According to one or more further embodiments, the at least one solid particulate filler F comprises or consists of the at least one inert mineral filler F5, preferably selected from the group consisting of calcium carbonate, magnesium carbonate, diatomaceous earth, pumice, dolomite, xonotlite, perlite, barite, and comminuted concrete, more preferably from the group consisting of calcium carbonate and magnesium carbonate.

According to one or more embodiments, the starting composition further comprises at least one surfactant SF. The term "surfactant" refers to surface tension lowering substances, which are typically organic compounds containing both hydrophobic and hydrophilic groups. Surfactants are commonly classified, based on the charge of their hydrophilic groups, to anionic, cationic, amphoteric, non-ionic, and polymeric surfactants.

Examples of suitable anionic surfactants to be used as the at least one surfactant SF include, for example, surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants to be used as the at least one surfactant SF include, for example, quaternary ammonium or phosphonium compounds, such as, for example, tetraalkylammonium salts; N,N-dialkylimidazoline compounds; dimethyldistearylammonium compounds; N-alkylpyridine compounds; and ammonium chlorides.

Amphoteric (zwitterionic) surfactants have both cationic and anionic centers attached to the same molecule. Examples of suitable amphoteric surfactants to be used as the at least one surfactant SF include, for example, amphoteric electrolytes such as aminocarboxylic acis and betaines.

Examples of suitable non-ionic surfactants to be used as the at least one surfactant SF include, for example, ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

According to one or more embodiments, the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Suitable glycerol monostearates are commercially available, for example, under the trade name of Dimodan® HP (from Danisco).

Suitable polycarboxylate ethers include polycarboxylate ether-based superplasticizers (PCEs), which are composed by a methoxy-polyethylene glycol copolymer (side chain) grafted with methacrylic acid copolymer (main chain). Suitable polycarboxylate ether-based superplasticizers are commercially available, for example, under the trade names of Viscocrete® Polymer PC-2, Viscocrete® Polymer RMC-2, Viscocrete® 125 P, and Cemerol® R-750 MC (from Sika AG).

Suitable polyether-modified polysiloxanes include polyetherpolysiloxane copolymers, which are commercially available, for example, under the trade name of Tegostab® B8870 (from Evonik Industries).

Suitable polyalkylene oxide siloxanes are commercially available, for example, under the trade name of Niax® L-1500 (from Momentive).

Examples of suitable hydroxyethyl amines include bis(2-hydroxyethyl) amines, which are commercially available, for example, under the trade name of Armostat® 300 (from Akzo Nobel).

Suitable erucamides and stearyl stearamides are commercially available, for example, under the trade names of Kemamide® E180 and Kemamide® S180 (from PMC Biogenix).

Examples of suitable alkali metal alkanesulfonates include sodium alkanesulfonates, which are commercially available, for example, under the trade names of Armostat® 3002 (from Akzo Nobel) and Loxiol® 93P (from Emery Oleochemicals).

Suitable alkylarylsulfonates are commercially available, for example, under the trade name of ZetaSphere®, such as ZetaSphere® 2300, ZetaSphere® 3100 and ZetaSphere® 3700 (from Airproducts).

The at least one surfactant SF preferably comprises, if present in the starting composition, at least 0.01 wt.-%, more preferably at least 0.05 wt.-%, even more preferably at least 0.1 wt.-%, of the total weight of the starting composition. It is also preferred that the amount of the at least one surfactant SF in the starting composition is not more than 10 wt.-%, more preferably not more than 5 wt.-%, even more preferably not more than 3.5 wt.-%, based on the total weight of the starting composition.

According to one or more embodiments, the at least one surfactant SF comprises 0.05-7.5 wt.-%, preferably 0.1-5.0 wt.-%, more preferably 0.25-3.5 wt.-%, even more preferably 0.5-3.0 wt.-%, still more preferably 0.5-2.5 wt.-% of the total weight of the starting composition.

The starting composition can further comprise one or more additives, for example, UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids. The total amount of such additives is preferably not more than 15 wt.-%, more preferably not more than 10 wt.-%, even more preferably not more than 5 wt.-%, based on the total weight of the starting composition.

Preferably, the waterbar fulfils the general requirements for sealing elements used for sealing of expansion, contraction, or construction joints in concrete structures, particularly the requirements as defined in the following standards: DIN 18541 parts 1 and 2; BS 903 and BS 2571; CRD-C 572-74, ASTM D 412-75, and ASTM D 638; and DIN 18195:2017-07, DIN 18197:2018-01, and DIN 7865:2015-02.

According to one or more embodiments, the center portion of the single-layer waterbar is in a form of an expansion element, which is configured such that it can stretch in lateral and/or transverse direction beyond the normal elastic ability of the material of which it is made of. This type of expansion element can be in any provided in any suitable form, such as in form of a hollow profile having a closed or open cross section, such as an arch-, bellows-, or loop-shaped cross-section. These types of expansion elements allow a wider range of movement in transverse, lateral or shear directions than a planar element composed of the same material. They also enable greater amount of movement without excessively stretching the material.

According to one or more embodiments, the expansion element is in a form of a hollow profile having a closed cross-section and inner and outer major surfaces. These types of expansion elements are commonly known as "center bulbs". The type of the closed cross-section of the hollow profile is not particularly restricted. It may be, for example, preferable that the hollow profile has a circular-, oval-, hexagonal-, pentagonal-, square-, or triangular-shaped cross section.

Instead of a center bulb, the expansion element may also be provided in form a hollow profile having an open cross-section. According to one or more embodiments, the expansion element is in a form of a hollow profile having an open cross-section and top and bottom major surfaces. These types of cross-sections may be preferred, for example, in order to enable a simplified production process of the single-layer waterbar. The type of the open cross-section of the hollow profile is not particularly restricted. It may be, for example, preferable that the hollow profile has U-, V-, Z, or W-shaped cross-section or a loop-, an arch-, or a bellows-shaped cross-section.

The preferences given above for the starting composition, the at least one polymer P, the at least one ethylene vinyl acetate copolymer P1, the at least one polyethylene, the at least one solid particulate filler F, the at least one chemical blowing agent CBA, and to the at least one surfactant SF apply equally to all other subjects of the present invention unless stated otherwise.

Another subject of the present invention is use of a single-layer extruded profile as a waterbar, wherein said single-layer extruded profile has been obtained by a method comprising extruding a melt-processed starting composition through an extruder die, wherein the starting composition comprises:

a) 35-75 wt.-%, preferably 40-70 wt.-%, more preferably 45-70 wt.-%, even more preferably 50-65 wt.-%, still more preferably 55-65 wt.-%, of at least one polymer P and
b) 25-65 wt. %, preferably 30-60 wt.-%, more preferably 30-55 wt.-%, even more preferably 35-50 wt.-%, still more preferably 35-45 wt.-%, of at least one solid particulate filler F, all proportions being based on the total weight of the starting composition.

The single-layer extruded profile comprises first and second major surfaces, i.e. top and bottom surfaces, limited by peripheral edges and defining a thickness of the single-layer extruded profile therebetween.

The melt processing of the starting composition can be conducted as a batch process using any conventional mixer, such as a Brabender, Banbury, or roll mixer or as continuous process using a continuous type mixer, preferably an extruder, such as a single screw or a twin-screw extruder or a planetary roller extruder Preferably, the method for obtaining the single-layer extruded profile is a single layer extrusion process, where the melt-processed starting composition is extruded using an extrusion apparatus comprising one single extruder, i.e. the melt-processed starting composition is extruded through the extruder die using an extrusion apparatus comprising one single extruder.

According to one or more embodiments, the method for obtaining the extruded profile comprises a further step of subjecting at least one of the first and second major surfaces of the single-layer extruded profile to a mechanical surface treatment step selected from the group consisting of grinding, brushing, and abrasive blasting.

According to one or more embodiments, the melt-processed starting composition comprises a blowing gas, which is released from the melt-processed starting composition through surface(s) of the extruded profile discharged from the extruder die. In these embodiments, the sheet of molten polymer composition discharged from the extruder die is first inflated due to volume increase of the blowing gas, which results in formation of closed cell structure. Eventually, the surface(s) of the extruded profile is/are penetrated by the blowing gas, which results in formation of open or semi-open cells, pores, cavities, and other surface imperfections which are accessible from the side of the first and second major surfaces of the extruded profile. In order to prevent a premature release of the blowing gas from the melt-processed starting composition, i.e. before the starting composition is discharged through the extruder die, the extruder is preferably operated with closed venting unit(s).

The blowing gas released from the melt-processed starting composition through the surface(s) of the extruded profile is preferably present in the starting composition or in the melt-processed starting composition in form of a physical or chemical blowing agent. In case of a chemical blowing agent, the blowing agent is preferably added to the starting composition and the blowing gas is generated during the melt-processing of the starting composition. In case of a physical blowing agent, the blowing agent is preferably added to the starting composition or to the melt-processed starting composition before the melt-processed composition is extruded through the extruder die. Suitable physical and chemical blowing agents have already been discussed above.

According to one or more embodiments, the starting composition further comprises:
c) At least one chemical blowing agent CBA.

The at least one chemical blowing agent CBA is preferably present in the starting composition in an amount of not more than 2.5 wt.-%, more preferably not more than 1.5 wt.-%, even more preferably not more than 1.0 wt.-%, still more preferably not more than 0.75 wt.-%, most preferably not more than 0.5 wt.-%, based on the total weight of the starting composition.

According to one or more embodiments, the at least one chemical blowing agent CBA comprises at least 0.05 wt.-%, preferably at least 0.1 wt.-%, more preferably at least 0.15 wt.-%, of the total weight of the starting composition. According to one or more further embodiments, the at least one chemical blowing agent CBA comprises 0.05-1.0 wt.-%, preferably 0.1-0.75 wt.-%, more preferably 0.1-0.75 wt.-%, even more preferably 0.15-0.5 wt.-%, still more preferably 0.15-0.35 wt.-%, of the total weight of the first starting composition.

According to one or more embodiments, the single-layer extruded profile has been obtained by using the method for producing a single-layer waterbar of the present invention.

The preferred dimensions the extruded profile, such as thickness, width, and length depend mainly on the anticipated hydrostatic head of water against which the extruded profile is installed in a concrete joint and on the size of the joint opening. It may, for example, be preferred that the extruded profile has a total width in the range of 50-1500 mm, more preferably 100-1000 mm. The width of the extruded profile is understood to mean the dimension of the extruded profile, which is measured in direction of the width of the joint opening to be sealed.

The thickness of the extruded profile may be constant or variate in the longitudinal and/or transverse direction of the profile.

According to one or more embodiments, the extruded profile has a maximum thickness, determined by using the measurement method as defined in DIN EN 1849-2 standard, of 1-25 mm, preferably 2.5-20 mm, more preferably 3.5-15 mm, even more preferably 5-15 mm and/or a minimum thickness, determined by using the measurement method as defined in DIN EN 1849-2 standard, of 0.5-25 mm, preferably 1-20 mm, more preferably 1.5-15 mm, even more preferably 2.5-15 mm.

According to one or more embodiments, the mass per unit area of the extruded profile is in the range of 1000-50000 $g/m^2$, preferably 1500-35000 $g/m^2$, more preferably 2500-25000 $g/m^2$, even more preferably 3500-20000 $g/m^2$. The mass per unit area of a single-layer waterbar can be determined by measuring the mass of test piece of the waterbar having a given area and dividing the measured mass by the area of the test piece.

According to one or more embodiments, the extruded profile is used as an internal joint waterbar for sealing of a joint in a concrete structure.

According to one or more embodiments, the extruded profile is used as an external joint waterbar for sealing of a joint in a concrete structure.

Another subject of the present invention is a method for sealing an internal joint between two sections of concrete, the method comprising steps of providing a single-layer waterbar obtained by using the method for producing a single-layer waterbar of the present invention and casting a first and a second section of concrete such that:
A first side portion of the single-layer waterbar becomes embedded in the first section of concrete,
A second side portion of the single-layer waterbar becomes embedded in the second section of concrete, and
A center portion of the single-layer waterbar is positioned in the joint formed between the first and second casted concrete sections.

The first and second sections of concrete can form a part of any structural or civil engineering structure, which is to be sealed against moisture and water, such as a an aboveground or underground structure, for example a building, garage, tunnel, landfill, water retention, pond, or dike.

The details of the method depend on the type of the joint to be sealed, particularly if the joint to be sealed is an expansion, a contraction or a construction joint. According to one on or more embodiments, the method for sealing an internal joint between two sections of concrete comprises steps of:
i) Positioning the single-layer waterbar such that the center portion of waterbar is positioned between upper and lower parts of a split formwork,
ii) Optionally securing the first side portion of the single-layer waterbar to one or more reinforcing steel bars,
iii) Casting the first section of concrete such that the first side portion of the single-layer waterbar becomes embedded in concrete, and
iv) Casting a second section of concrete such that the second side portion of the single-layer waterbar becomes embedded in concrete.

Another subject of the present invention is a method for sealing an external joint between two sections of concrete, the method comprising steps of:
I) Providing a single-layer waterbar obtained by using the method for producing a single-layer waterbar of the present invention,
II) Positioning the single-layer waterbar to a base onto which concrete is to be cast,
III) Casting a first and a second section of concrete such that:
A center portion of the single-layer waterbar is located in or along the joint formed between the casted sections of concrete,
A top surface of a first side portion of the single-layer waterbar forms a bond to the surface of the first section of concrete, and
A top surface of the second side portion of the single-layer waterbar forms a bond to the surface of the second section of concrete.

Another subject of the present invention is a sealed construction comprising two sections of concrete, a gap between the sections of concrete, and a waterbar obtained by using the method for producing a single-layer waterbar located at the joint, the first side portion of the waterbar being bonded to the first section of concrete, the center portion of the profile being located in the gap or along the gap, and the second side portion of the waterbar being bonded to the second section of concrete.

According to one or more embodiments, the first side portion of the waterbar is embedded in the first section of concrete and the second side portion of the waterbar is embedded in the second section of concrete, wherein the center portion of the profile is located in a gap.

According to one or more further embodiment, the center portion of the waterbar is located in or along the joint formed between the sections of concrete, a top surface of a first side portion of the waterbar is bonded to the surface of the first section of concrete, and a top surface of the second side portion of the waterbar is bonded to the surface of the second section of concrete.

According to one or more embodiments, the sealed construction has been obtained by using the method for sealing an internal joint between two sections of concrete of the present invention or by using the method for sealing an external joint between two sections of concrete of the present invention.

EXAMPLES

The followings compounds shown in Table 1 were used in the examples:

TABLE 1

| | |
|---|---|
| Polymer P11 | Ethylene vinyl acetate copolymer, content of vinyl acetate 28 wt.-%, MFR (190° C./2.16 kg) 1-5 g/10 min (ISO 1133) |
| Polymer P12 | Ethylene vinyl acetate copolymer, content of vinyl acetate 12 wt.-%, MFR (190° C./2.16 kg) 5-10 g/10 min (ISO 1133) |
| Polymer P2 | Linear low-density polyethylene, MFR (190° C./2.16 kg) 4-5 g/10 min (ISO 1133) |
| Filler F | Portland composite cement CEM II/B-M (T-LL) (SN EN 197-1) |
| CBA | Sodium hydrogen carbonate, decomposition temperature 124° C. |

Preparation of Single-Layer Waterbars

The inventive and reference single-layer waterbars were produced using an extrusion apparatus comprising a single screw extruder (KAUFMAN), an extrusion die, and a water bath.

A starting composition containing the constituents of the waterbar was first melt-processed in the single-screw extruder. The starting compositions were provided as single granulates containing all the constituents of the starting compositions. In case a starting composition contained a chemical blowing agent (CBA), the extruder was operated with closed venting unit in order to prevent the escape of blowing gases before the extruder die.

The compositions of the starting compositions and operating conditions of the extrusion apparatus during production of the waterbars are presented in Table 2. The extrusion temperature and pressure were measured at a point, where the melt-processed mass entered the inlet of the flat die. The temperature of the waterbath was approximately 20° C. during the production process.

Preparation of the Concrete Test Specimen

Three samples with a dimension of 200 mm (length)×50 mm (width) were cut from each of the single-layer waterbars produced as described above. The sample strips were placed into formworks having a dimension of 200 mm (length)×50 mm (width)×30 mm (height).

One edge of each sample strip was covered with an adhesive tape having a length of 50 mm and width coinciding with the width of the strip to prevent the adhesion to the hardened concrete. The adhesive tapes were used to provide easier installation of the test specimens to the peel resistance testing apparatus.

For the preparation of concrete specimens, a batch of fresh concrete formulation was prepared. The fresh concrete formulation was obtained by mixing 8.9900 kg of a concrete dry batch of type MC 0.45 conforming to EN 1766 standard, 0.7440 kg of water and 0.0110 kg of Viscocrete 3082 for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Viscocrete 3082 the concrete dry batch was homogenized for five minutes in a tumbling mixer.

The formworks containing the sample strips were subsequently filled with the fresh concrete formulation and vibrated for two minutes to release the entrapped air. After hardening for 24 hours under standard atmosphere (air temperature 23° C., relative air humidity 50%), the test concrete specimens were stripped from the formworks and measured for concrete peel resistances.

Concrete Peel Resistances

The measurement of peel resistances was conducted in accordance with the procedure laid out in the standard DIN EN 1372:2015-06. A Zwick Roell AllroundLine Z010 material testing apparatus equipped with a Zwick Roell 90°-peeling device (type number 316237) was used for conducting the peel resistance measurements.

In the peel resistance measurements, a concrete specimen was clamped with the upper grip of the material testing apparatus for a length of 10 mm at the end of the concrete specimen comprising the taped section of the sample strip. Following, the strip was peeled off from the surface of the concrete specimen at a peeling angle of 90° and at a constant cross beam speed of 100 mm/min. During the measurements the distance of the rolls was approximately 570 mm. The peeling of the sample strip was continued until a length of approximately 140 mm of the strip was peeled off from the surface of the concrete specimen. The values for peel resistance were calculated as average peel force per width of the sample strip [N/50 mm] during peeling over a length of approximately 70 mm thus excluding the first and last quarter of the total peeling length from the calculation.

The average peel resistance values presented in Table 2 have been calculated as an average of three measurements conducted with the same single-layer waterbar.

Tensile Strength and Elongation at Break

Tensile strength and elongation at break (MD, CD) were measured according to ISO 527-3:2018 standard at a temperature of 21° C. using a Zwick tensile tester and a cross head speed of 100 mm/min.

TABLE 2

| | Ref-1 | Ex-1 | Ex-2 | Ex-3 | Ex-4 |
|---|---|---|---|---|---|
| Composition, wt.-% | | | | | |
| Polymer P11 | 0.0 | 59.5 | 0.0 | 0.0 | 30.0 |
| Polymer P12 | 100.0 | 0.0 | 59.5 | 30.0 | 0.0 |
| Polymer P2 | 0.0 | 0.0 | 0.0 | 29.5 | 29.8 |
| Filler F | 0.0 | 40.0 | 40.0 | 40.0 | 40.0 |
| CBA | 0.0 | 0.5 | 0.5 | 0.5 | 0.3 |
| Total | 100.0 | 100.0 | 100.0 | 100.0 | 100.0 |
| Mechanical properties | | | | | |
| Bonding to concrete 28 d, N/50 mm | 0 | 152 | 55 | 73 | 88 |
| Tensile strength MD, N/mm2 | 13.0 | 4.2 | 2.2 | 1.9 | 6.0 |
| Tensile strength CD, N/mm2 | n.a. | 2.9 | 1.9 | 1.6 | 5.5 |
| Elongation MD, % | 620 | 559 | 27 | 26 | 491 |
| Elongation CD, % | n.a. | 502 | 27 | 23 | 413 |

MD = machine direction, CD = cross machine direction

The invention claimed is:

1. A method for producing a single-layer waterbar, the method comprising extruding a melt-processed starting composition through an extruder die to provide an extruded profile, wherein the starting composition comprises:
   a) 40-70 wt.-%, of at least one polymer P,
   b) 30-60 wt. %, of a least one solid particulate filler F,
   c) 0.1-1.5 wt.-% of at least one chemical blowing agent CBA, wherein
      the melt-processed starting composition comprises a blowing gas, which is released from the melt-processed starting composition through surface(s) of the extruded profile discharged from the extruder die, and
      the blowing gas is released from the melt-processed starting composition through surface(s) of the extruded profile discharged from the extruder die to form an open pore structure in the extruded profile.

2. The method according to claim 1, wherein the method is a single-layer extrusion process, wherein the melt-processed starting composition is extruded using an extruder apparatus comprising one single extruder.

3. The method according to claim 1, wherein the single-layer waterbar is composed of the extruded profile.

4. The method according to claim 1, wherein the at least one polymer P has a melt flow rate determined according to ISO 1133-1:2011 (190° C./2.16 kg) of not more than 25 g/10 min and/or a flexural modulus at 23° C. determined according to ISO 178:2019 standard of not more than 500 MPa.

5. The method according to claim 1, wherein the at least one polymer P is selected from the group consisting of ethylene vinyl acetate copolymers, polyolefins, halogenated polyolefins, polyvinylchloride, and rubbers.

6. The method according to claim 1, wherein the at least one polymer P comprises at least one ethylene vinyl acetate copolymer P1.

7. The method according to claim 1, wherein the at least one polymer P comprises at least one polyethylene P2.

8. The method according to claim 6, wherein the weight ratio of the amount of the at least one ethylene vinyl acetate copolymer P1 to the amount of the at least one polyethylene P2 is from 3:1 to 1:3.

9. The method according to claim 1, wherein the at least one solid particulate filler F is selected from the group consisting of inert mineral fillers, mineral binders, and synthetic organic fillers.

10. The method according to claim 1, further comprising at least one surfactant SF.

11. The method according to claim 1, wherein the at least one polymer P, comprises at least one propylene α-olefin copolymer, selected from the group consisting of random or block copolymers of propylene and ethylene; random or block copolymers of propylene and at least one $C_4$-$C_{20}$ α-olefin monomer.

12. The method according to claim 11, wherein the at least one $C_4$-$C_{20}$ α-olefin monomer comprises at least one selected from the group consisting of 1-butene, 1-pentene, 1-hexene, 1-heptene, 1-octene, 1-decene, 1-dodecene, and 1-hexadodecene.

13. The method according to claim 12, wherein the at least one $C_4$-$C_{20}$ α-olefin monomer comprises at least 60 wt.-%, of propylene-derived units, based on the weight of the copolymer.

* * * * *